United States Patent [19]

Leedom et al.

[11] Patent Number: 5,247,637
[45] Date of Patent: Sep. 21, 1993

[54] METHOD AND APPARATUS FOR SHARING MEMORY IN A MULTIPROCESSOR SYSTEM

[75] Inventors: George W. Leedom, Jim Falls; Alan J. Schiffleger, Chippewa Falls; Ram K. Gupta, Eau Claire, all of Wis.

[73] Assignee: Cray Research, Inc., Eagan, Minn.

[21] Appl. No.: 531,861

[22] Filed: Jun. 1, 1990

[51] Int. Cl.⁵ .............................................. G06F 13/14
[52] U.S. Cl. ............................. 395/425; 364/DIG. 1; 364/223.1; 364/223.3; 364/243; 364/243.6
[58] Field of Search ... 364/200 MS File, 900 MS File; 395/400, 425, 800

[56] References Cited

U.S. PATENT DOCUMENTS

| | | | |
|---|---|---|---|
| 3,317,898 | 5/1967 | Hellerman | 364/200 |
| 3,348,210 | 10/1967 | Ochsner | 364/200 |
| 4,051,551 | 9/1977 | Lawire et al. | 364/200 |
| 4,212,057 | 7/1980 | Devlin et al. | 364/200 |
| 4,280,176 | 7/1981 | Tan | 364/200 |
| 4,365,292 | 12/1982 | Barnes et al. | 364/200 |
| 4,380,798 | 4/1983 | Shannon et al. | 364/200 |
| 4,392,200 | 7/1983 | Arulpragasam et al. | 364/200 |
| 4,394,725 | 7/1983 | Bienvenu et al. | 364/200 |
| 4,394,727 | 7/1983 | Hoffman et al. | 364/200 |
| 4,394,730 | 7/1983 | Suzuki et al. | 364/200 |
| 4,400,769 | 8/1983 | Kaneda et al. | 364/200 |
| 4,400,771 | 8/1983 | Suzuki | 364/200 |
| 4,402,046 | 8/1983 | Cox et al. | 364/200 |
| 4,435,765 | 3/1984 | Uchida et al. | 364/200 |
| 4,442,487 | 4/1984 | Fletcher et al. | 364/200 |
| 4,449,183 | 5/1984 | Flahive et al. | 364/200 |
| 4,455,602 | 6/1984 | Baxter, III et al. | 364/200 |
| 4,480,304 | 10/1984 | Carr et al. | 364/200 |
| 4,489,381 | 12/1984 | Lavallee et al. | 364/200 |
| 4,493,036 | 1/1985 | Boudreau et al. | 364/200 |
| 4,509,140 | 4/1985 | Cheung | 364/900 |
| 4,563,738 | 1/1986 | Klan | 364/200 |
| 4,630,230 | 12/1986 | Sundet | 364/900 |
| 4,636,942 | 1/1987 | Chen et al. | 364/200 |
| 4,661,900 | 4/1987 | Chen et al. | 364/200 |
| 4,745,545 | 5/1988 | Schiffleger | 364/200 |
| 4,754,398 | 6/1988 | Pribnow | 364/200 |
| 4,766,535 | 8/1988 | Auerbach et al. | 364/200 |
| 4,901,230 | 2/1990 | Chen et al. | 364/200 |
| 4,945,479 | 7/1990 | Rusterholz et al. | 364/200 |

Primary Examiner—Rebecca L. Rudolph
Attorney, Agent, or Firm—Merchant, Gould, Smith, Edell, Welter and Schmidt

[57] ABSTRACT

The present invention provides a memory interface system wherein there is provided a memory having multiple ports and divided into sections, with each section divided into subsections, with memory banks within each subsection, and the banks divided into at least two bank groups. The invention further provided a memory interface for controlling the referencing of said memory banks according to which bank group they are in.

7 Claims, 6 Drawing Sheets

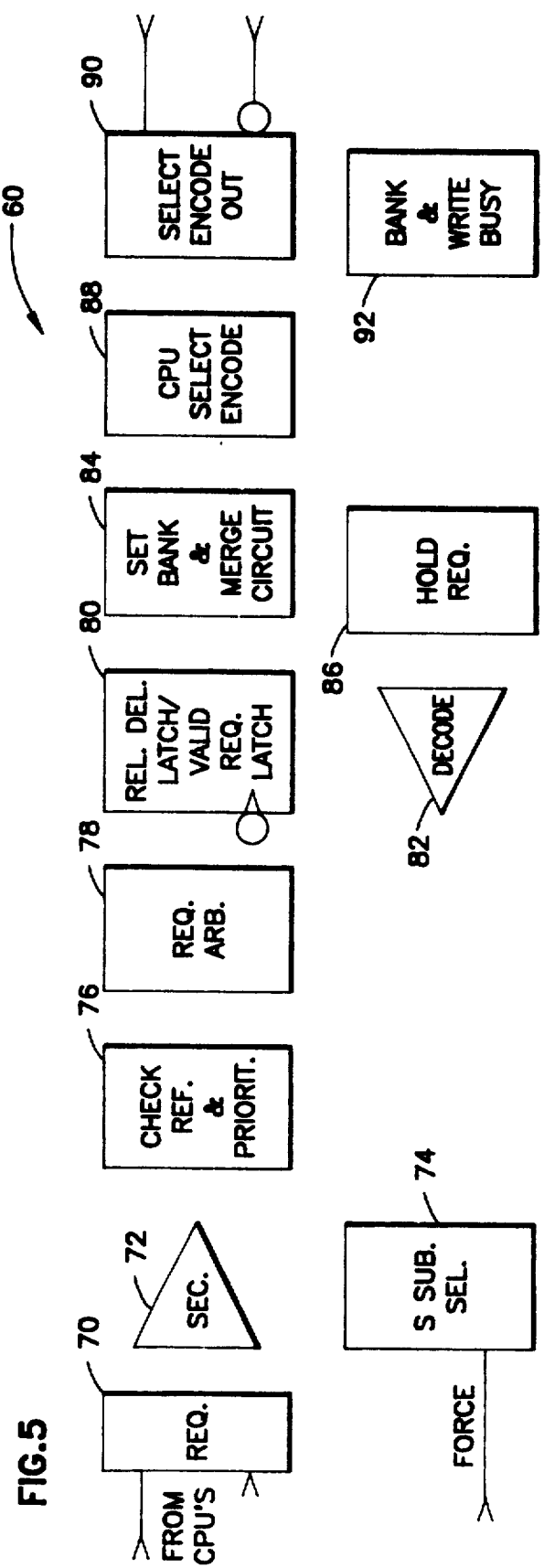

METHOD AND APPARATUS FOR SHARING MEMORY IN A MULTIPROCESSOR SYSTEM

TECHNICAL FIELD OF THE INVENTION

The present invention pertains generally to the field of multiprocessor computer systems and more particularly to method and apparatus for sharing a memory system between multiple processors.

BACKGROUND OF THE INVENTION

In many cases the data processing speed of a computer system can be greatly enhanced by providing one or more additional processors to form a multiprocessor system in which a common or central RAM memory is shared. However, the sharing of resources, particularly the memory, results in conflicts between the processors' various memory reference requests, such that if the memory, memory paths, and the memory access control logic is not properly designed much of the potential increase in efficiency and economy of the system can be lost to access delays.

Minimizing conflicts and delays in accessing a shared memory is typically accomplished in two different but cooperative ways. One way is to segment the shared memory into many independently addressable banks such that each reference to a bank ties up a relatively small percentage of the memory, leaving the rest of the memory accessible. Segmenting memory, however, increases the complexity and thus size and cost can also impose limitations on the speed at which each reference may be accomplished.

Memory reference delays can also be managed and minimized through careful design of the memory pathways between the processors and the addressable banks in the memory, and of the conflict resolution circuits which arbitrate conflicting memory requests. As may be readily appreciated, the design of this "memory interface" and the design of the memory organization are interrelated and interdependent.

Ideally, the memory interface should provide for maximum utilization of the available memory access paths such that each processor has substantially equal accessibility to the memory at most times, particularly where there is no master-salve relationship between the processors. In addition, it is desireable that memory access conflicts be resolved in as few system clock periods as possible so that reference start up time and data buffering requirements are held to a minimum. The attainment of these goals is, however, restrained by the cost and particularly the quantity of logic which may be employed. In particular, in the case of high-speed vector processing machines there are tight restrictions on the space which may be allotted to interface circuits due to the necessity to bring all processors into close proximity to the memory in order that propagation delays be minimized. In addition, it is desireable that logic and wiring requirements be held down.

As is well appreciated by those skilled in the art, attaining an efficient, economical and workable memory interface becomes increasingly difficult as the number of processors is increased. Those designs which may be quite efficient in a dual or four processor system may be totally unsuitable for systems with more processors because of the increases in logic which are needed to adapt such schemes to a larger number of processors, and the additional demands made on the memory by the additional processors. Moreover, increasing the number of processors typically increases the nominal distance between a given processor and the memory, increasing signal propagation delay and placing further restraints on the number of logic levels which may be employed.

Accordingly, it is readily seen that the system used to share memory in a multiprocessor system is crucial to its efficiency. Moreover, it is readily seen that there are not only a large number of constraints on the design of such systems but in addition that these constraints often work against one another to present a difficult design challenge.

SUMMARY OF THE INVENTION

The present invention provides a memory interface system wherein there is provided a memory having multiple ports and divided into sections, with each section divided into subsections, with memory banks within each subsection, and the banks divided into at least two bank groups. The invention further provides means for controlling the referencing of said memory banks according to which bank group they are in.

BRIEF DESCRIPTION OF THE DRAWING

FIG. 5 is a diagrammatic illustration of the memory reference control circuit 60.

DETAILED DESCRIPTION OF THE INVENTION

The present invention relates to a system for interfacing a plurality of CPUs to a central or shared memory. In particular, the invention is tailored for a multiprocessor system in which each processor is capable of generating memory references from several independent ports each of which may operate substantially independently of the CPU to carry out data and instruction transfers. An example of a CPU of the type of which the present invention is adapted to interface to a memory is shown in U.S. Pat. No. 4,661,900 to Chen et al., entitled "FLEXIBLE CHAINING IN A VECTOR PROCESSOR". The present invention is also related in design to the memory interface shown in U.S. Ser. No. 07/307,882, filed Feb. 7, 1989, and entitled Method and Apparatus for Sharing Memory in a Multiprocessor System the entire disclosure of which is hereby incorporated herein by reference. U.S. Ser. No. 07/307,882 was abandoned and refiled as U.S. Ser. No. 07/682,876, now U.S. Pat. No. 5,142,638, and U.S. Ser. No. 07/834,867, now U.S. Pat. No. 5,202,970.

Figure 1:
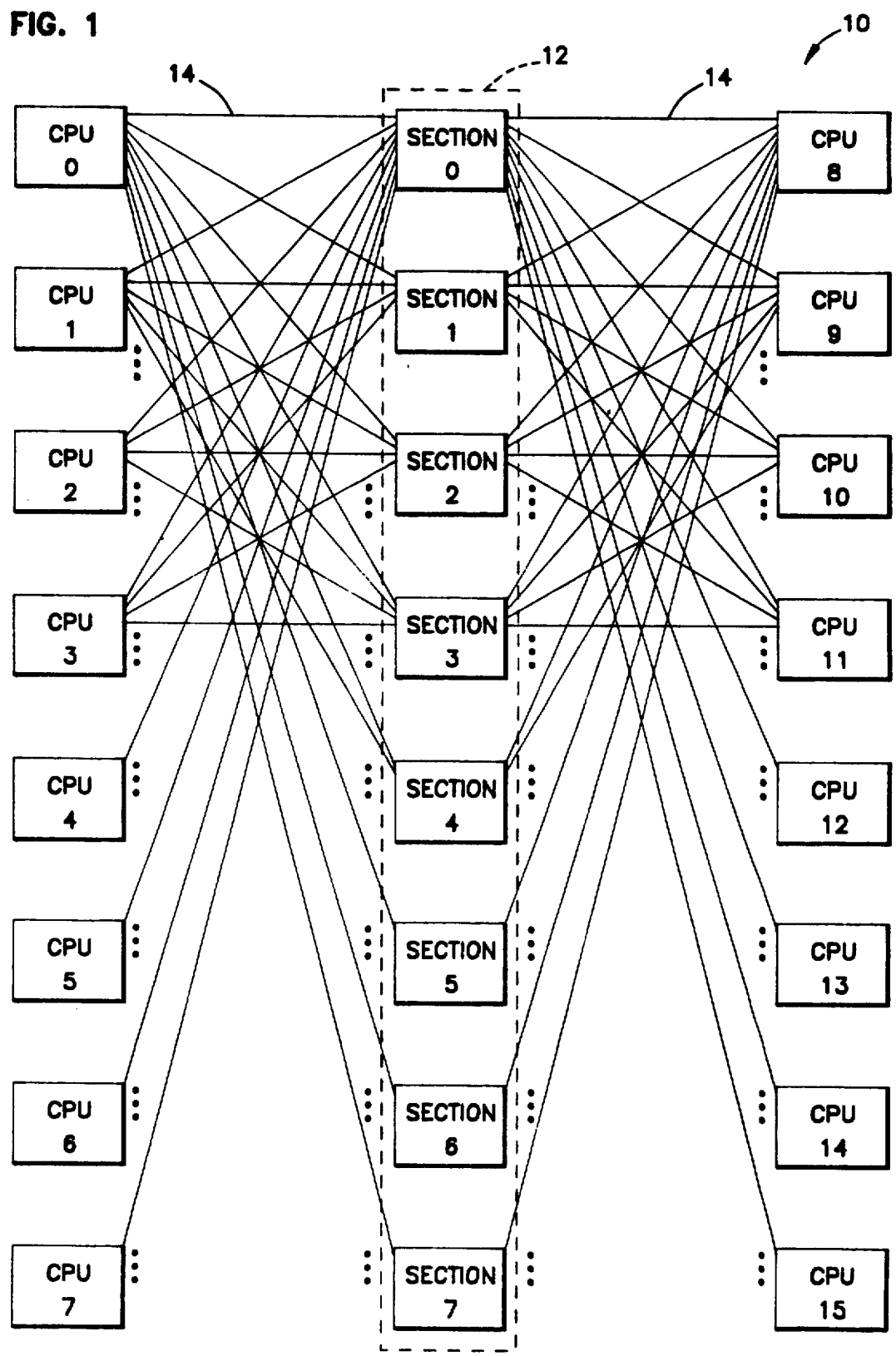
FIG. 1 is a simplified block diagram of the connection of the CPUs to the memory according to the present invention.

As shown in FIG. 1, the present invention is sixteen CPU's. It shall be understood, however, that the principles of the invention can be applied to multiprocessor systems having a greater or lesser number of CPUs.

Memory 12 of system 10 is organized into eight sections. Each of the CPUs is connected to each of these sections through a memory path 14. As will be described below, internal to each CPU represented in FIG. 1 are a plurality of reference generating ports, any one of which can be connected to any one of the eight paths 14 between each CPU and the respective sections of memory 12. Each path 14 consists of the following:

| | |
|---|---|
| 80 Bits | Write Data |
| 22 Bits | Address (Bits 10-31 - 32 million word words) |
| 1 Bit | Write Reference |
| 1 Bit | Abort Reference (Address Range Error) |
| 3 Bits | Subsection (Bits 3-5) |
| 4 Bits | Bank (Bits 6-9) |
| 1 Bit | Go Section |
| 80 Bits | Read Data |
| 3 Bits | Subsection Read Select |

Each address is configured as follows:

| | Section | Subsection | Bank | Chip Address |
|---|---|---|---|---|
| Address | $2^0 2^1 2^2$ | $2^3 2^4 2^5$ | $2^6 2^7 2^8 2^9$ | $2^{10} - 2^{31}$ |

The 80 bits of Write Data of path 14 comprise the data to be written from a CPU to the memory. The Go Section signals ANDED with 3-5 indicate which of the eight Subsections within each memory section the reference is to. The section to which a reference is directed is controlled by the first three bits of the address. These three bits determine which of the paths 14 the reference will use to access the proper section of memory.

The Write Reference signal on path 14 indicates whether the reference is a write or a read reference. The Abort Reference signal allows a reference to be aborted if an address range error is detected by range checking circuits in the CPU's memory reference generation circuits (not shown). The read data lines of each path 14 carry data from the memory to the CPU. Finally, three bits of Subsection Read Select Data is also carried on each path 14.

Figure 2:
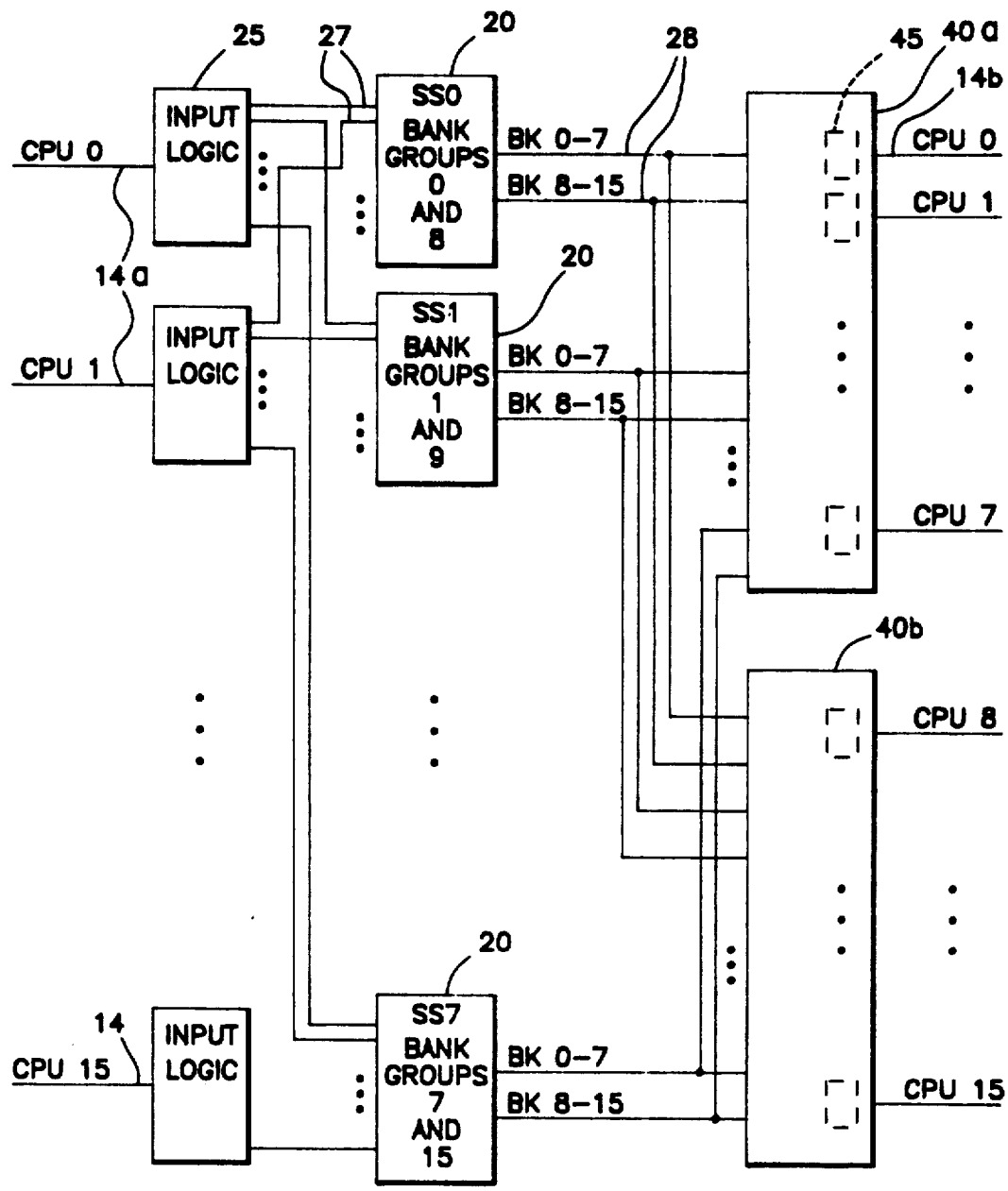
FIG. 2 is a simplified block diagram showing the structure of a section of memory.

The system 10 provides that one read or write reference can be made every clock period on each path 14, for a total of 128 references per clock period. FIG. 2 shows that each section of memory is organized into eight subsections (SS0-SS7) 20 each of which contain two groups of memory banks. Each group includes eight banks of memory (shown in FIG. 4A). Each CPU is connected to each one of the subsections 20 via one of paths 14a, each terminating in input logic 25. Path 14a constitutes that portion of path 14 carrying the data, address and control information into the memory necessary for a read or write operation. Logic 25, as will be described more fully below, includes input registers and latches and provides a gateway to each of the memory subsections 20 via paths 27. Thus, each of CPUs 0-15 has a path through its respective logic 25 to each subsection 20 of memory.

Read data is carried out of each of subsections 20 on paths 28. There are two paths out for each subsection, one for data from memory bank group 0 (banks 0-7) and one for data from bank group 8 (banks 8-15). Each of these paths are connected to each of circuits 40a and 40b, which handle read data for CPUs 0-7 and CPUs 8-15, respectively. Paths 14b, which constitute the read data lines of paths 14 carry the read data for an associated CPU out of the section and back to the CPU ports.

Figure 3:
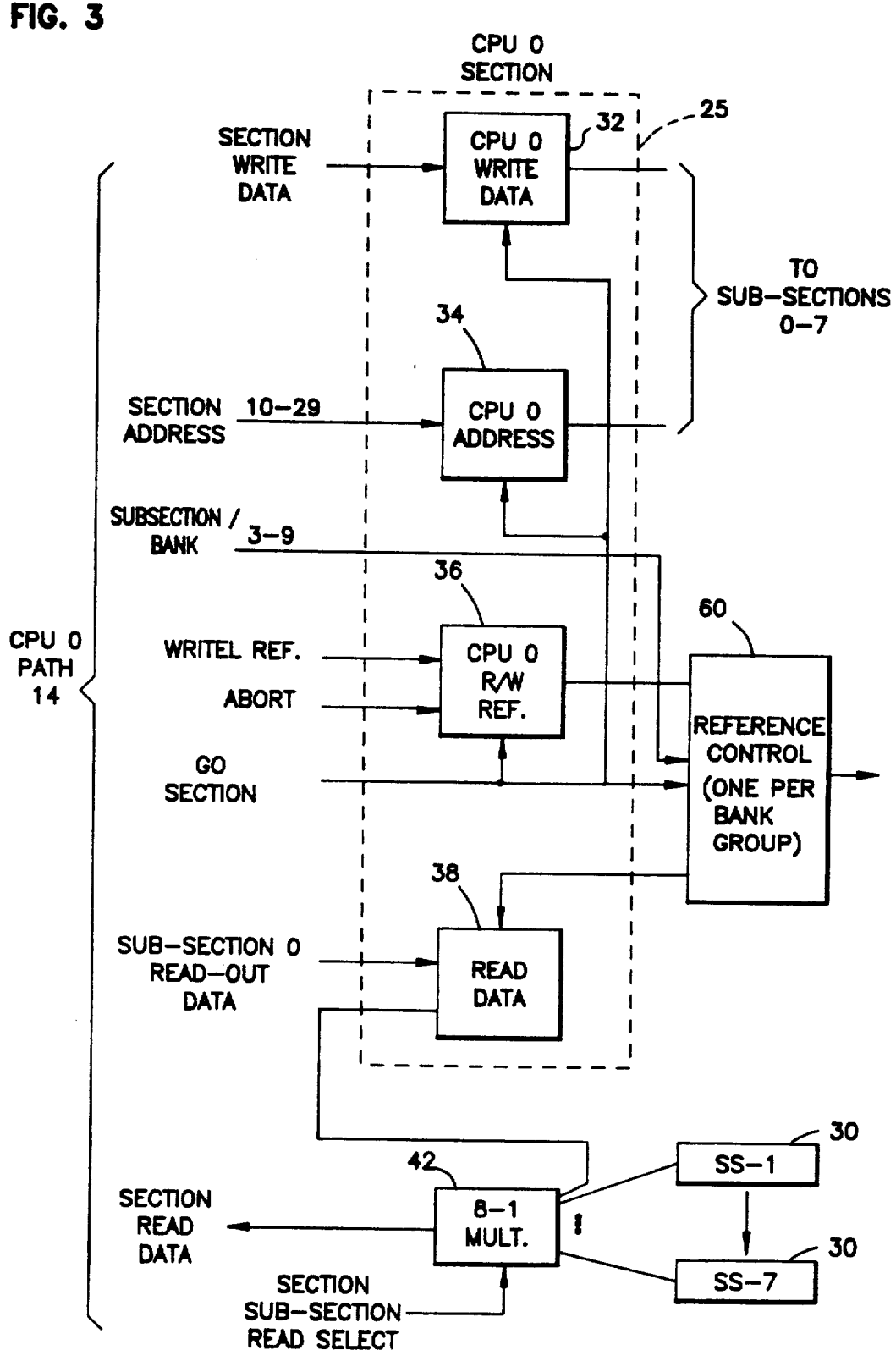
FIG. 3 is a simplified -block diagram showing the interface of one CPU to the subsections in greater detail.

Referring to FIG. 3 there is shown in simplified but more detailed form the interface of a CPU (CPU 0 for the sake of illustration) and a section. Section write data and address are staged at 32 and 34, respectively, for application to a subsection. Logic 36 receives the write reference and abort signals, along with a go-section signal. Reference control 60 (one of these is provided for each group of banks so that there are two for each sub-section) controls referencing to the memory. Logic 38 is responsive to reference control 60 and the sub-section read-out signal to control multiplexing of read data out of the sub-sections 30 via multiplexor/logic 42, which also receive for control input a sub-section read select signal.

Figure 4A:
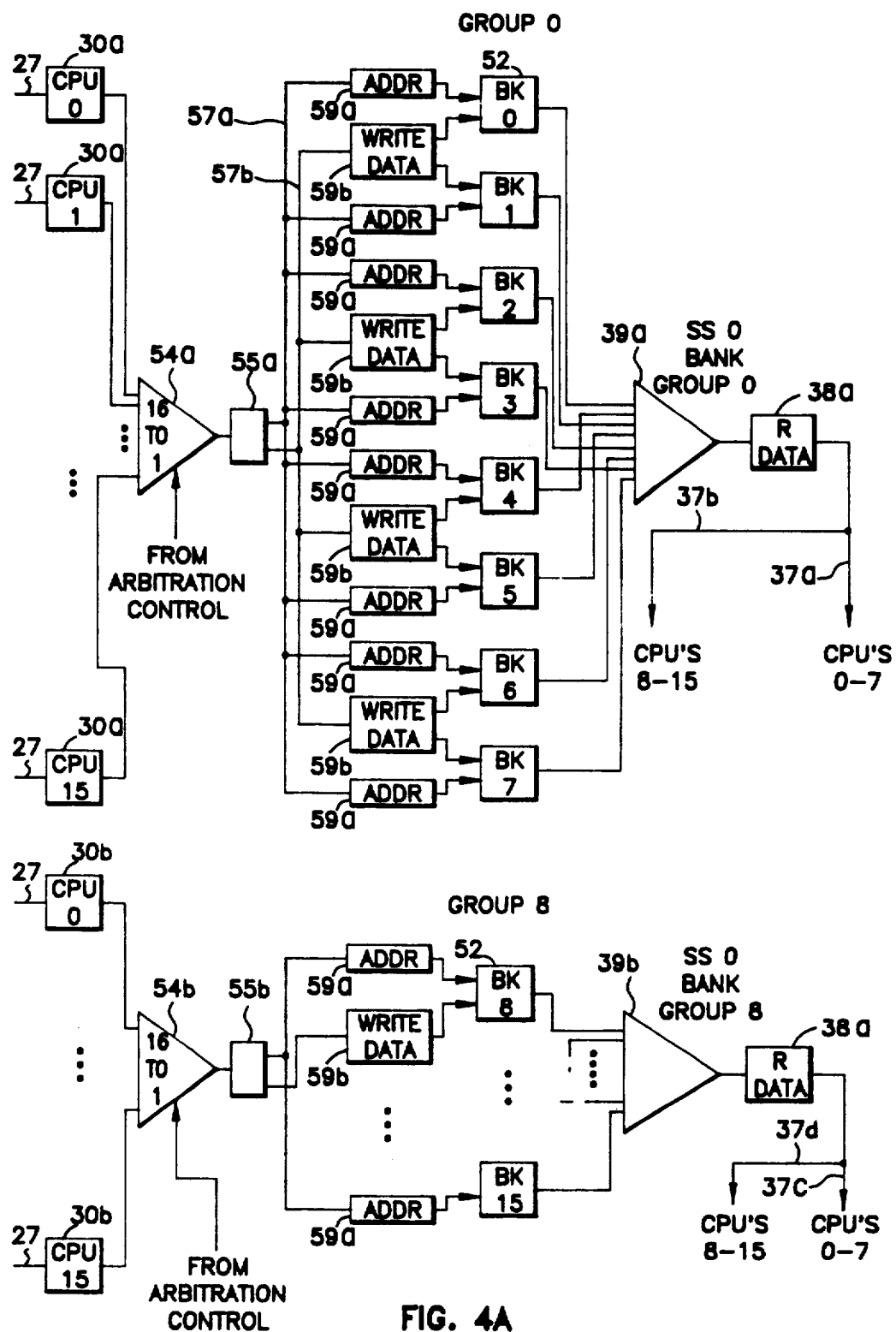
FIGS. 4A and 4B are more detailed block diagrams of the basic structure of a section of memory.

Referring now to FIG. 4A, there is shown a simplified block diagram of one subsection 20 of memory 12. Each subsection includes sixteen banks of memory. Accordingly, memory 12 includes a total of 1024 banks of memory. As noted above, the banks within each subsection are organized into two groups—group 0 and group 8—with one containing the first eight banks and the other the last eight. Each of the banks 52 contain a number of individually addressable memory locations each with its own unique address. Each bank may function independently of the others and can be referenced individually and/or simultaneously with another bank. However, although different banks may be accessed or referenced simultaneously, the present invention contemplates that no one bank may be referenced more than once every "n" number system clock cycles (every six clock cycles using the memory chips preferred in the present invention), due to the recovery time of the memory. The memory is preferably constructed with 64K×4 ECL chips available from Fujistu Electronics of Japan and its U.S. agents. FIG. 4A shows that each of paths 27 from circuits 25 (as illustrated in FIG. 3) have a two-to-one fan-out and terminate in a pair of latches 30a and 30b, one for each group of memory banks. Latches 30a are connected to a selector 54a, which in turn is connected to a latch 55a. Latch 55a is in turn fanned-out on two paths 57a and 57b. Paths 57a and latches 59a are provided to advance the reference address from latch 55a to the memory banks, with paths 57b and latches 59b carrying write data from latch 55a. Thus, each CPU may access any one of the first eight banks within the subsection through selector 54a and latch 55a. The last eight banks are accessed in the same manner through selector 54b and latch 55b.

Banks 0-7 are connected to selector 39a, the output of which is fanned-out on two paths, one for CPUs 0-7 and one for CPUs 8-15. Selector 39b is similarly connected to provide an output path for data read from banks 8-15.

Figure 4B:
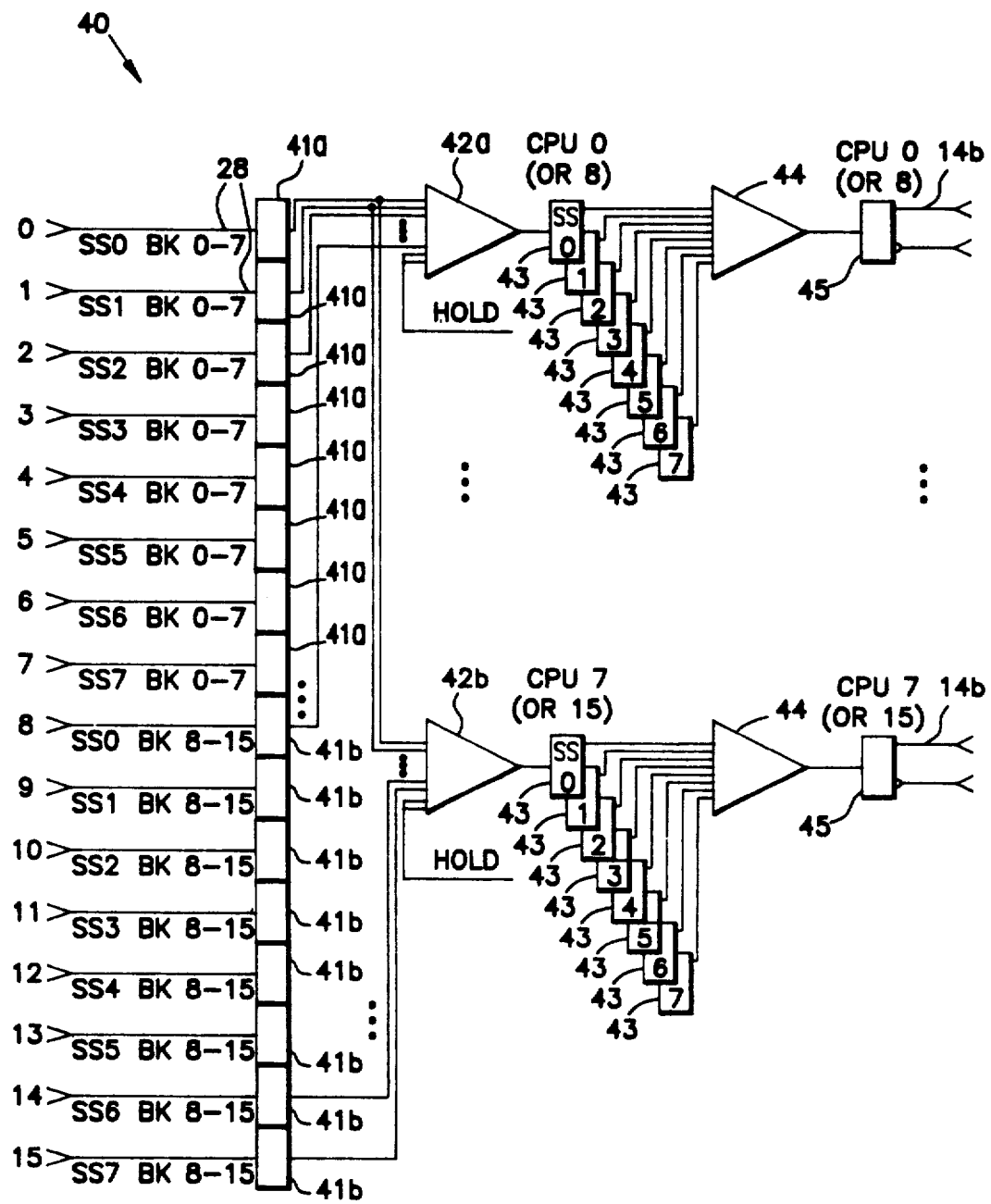

Referring now to FIG. 4B, there is shown in more detail one of the circuits 40a and 40b illustrated in FIG. 2. As illustrated in FIG. 2, one of circuits 40 is provided for each set of CPUs 0-7 (40a) and 8-15 (40b). Circuit 40 includes a plurality of latches 41a and 41b. One of latches 41a and 41b is provided for each subsection of memory. Latches 41a each receive, from each subsection in the section, the output from selector 39a carried on path 37a (the output from banks 0-7—see FIG. 4A). Latches 41b receive the output carried on paths 37c from selector 39b (for banks 8-15). A selector 42a and 42b is provided for each CPU, and each is connected to select from any one of latches 41a and 41b, respectively. The output of each selector 42 is in turn fanned out to a plurality of registers 43, one for each subsection within the section. Thus, the registers 43 associated with each CPU may hold a word of read data from each subsection of memory.

A further selector 44 is provided for each of CPUs 0-7, and is connected to select from any one of registers 43 and to provide its output to a latch 45. Latch 45 in turn delivers its output to path 14b. Thus, selector 44 and latch 45 can output one read word per clock cycle. As said above, another one of circuits 40 (40b) is provided for handling the output for CPUs 8-15.

Each bank group includes a reference control circuit 60 (FIG. 3) which controls the generation of references to the group. Reference control circuit 60 is schematically illustrated in FIG. 5. A reference request holding register 70 receives eight (8) signal lines from each of the sixteen (16) CPUs (for a total of 128). These signals are:

(1) Go-section signal (ANDED with ADDR 9)
(1) Write signal
(6) ADDR 3 thru 8 signals Circuit 72 is a bank and write busy selector. It receives eight (8) bank busy and four (4) write busy signals from the bank and write busy circuit 92. Subsection selection circuit 74 receives three force signals that define which subsection the reference control circuit 60 is to respond to. They must match ADDR 3-5 signals. Circuit 76 prioritizes valid requests and assures that the requested banks are free and that the request is for this subsection and if a write reference that write is free. It also evaluates requests based upon the present state of the priority counter. Request arbitration circuit 78 looks at all valid requests and the present state of the priority counter (described below) and determines which reference request to release.

Circuit 80 includes release delay latches and valid subsection request delay latches. The release delay latches provide that release latches are set for a reference request that is going to be released. The valid subsection request delay latches are set for a request that is presented to the subsection. The bank and write Decoder 82 decodes the bank number that a reference request is made to and the bank number to which a write request is made. Set bank and write busy merge Circuit 84 provides that the decoded bank and write signals are ANDED with the release signals from the release delay latches (circuit 80) and then OR'd to form the set bank and write busy signals.

Hold reference request circuit 86 provides that if a request for the subsection is not going to be released (i.e. the release latches are not set in circuit 80) it is held and evaluated during the next clock period. It is held by causing latch 70 to hold the pending request. CPU select encode circuit 88 encodes as a request number the number of the CPU making the reference request to the group. The select encode out circuit 90 provides that the encoded CP number (from circuit 88) is latched and presented to the memory (via circuit 54a of FIG. 4A).

The bank and write busy circuit 92 keeps track of which of the banks is busy with a read or write reference. The requested bank is set busy and write busy is set if a write is requested.

Operation of Reference Control

The above described reference control operates as follows. When CPU (1 or more of 16) makes a reference request to a memory section, the go-section signal is ANDED with bit 9 and also bit 9 not. If bit 9 is a zero all of the reference control circuits 60 for the lower bank groups (banks 0-7) will receive a go-section signal. If bit 9 is a one the reference control circuits 60 for the upper bank groups (8-15) will receive a go section signal. A write request is sent to all reference control circuits 60 together with the ADDR 3-8 signals. When a request is presented to the control circuit 60 it is clocked into the latches 70. If the request is not for the bank group associated with circuit 60 (circuit 72 compares ADDR bits 3-5 and the 3 force IDs to determine this), circuit 84 will not issue a hold to the latch 70 so that it will be enabled to receive the next reference request presented to it.

If the request is for the cirucit 60, circuit 72 will enable circuit 76 to evaluate the request provided that the requested bank is not busy (as determined by circuit 72). This evaluation, based on the priority counter, is passed on to circuit 78 to determine which reference request will be honored the clock period of the request. Request arbitration circuit 78 looks at the priorities of each valid request and determines which request (CPU) should be honored/released in the present clock period, should a conflict exist between requested banks.

Circuit 80 merges the output of circuit 78 and the delay latches capture the CPU/Request to be honored (from circuit 78) and also captures the valid Subsection Request from the subsection selection circuit 74. The bank and write decoder 82 decodes the bank and write numbers for each of the 16 CPUs/requests (there are sixteen parallel circuits for this). Circuit 84 uses the release from circuit 80 and the decodes from decoder 82 to form set bank and set write signals. Hold request circuit 86 uses the release from circuit 80 and the valid request from Selection circuit 74 to determine if the Request Register 70 should be allowed to clock or capture new information on the next clock cycle or hold a non-released reference for evaluation on the next clock cycle. Circuit 88 uses the release from circuit 80 to encode the request/CPU number.

Select encode out 90 is a set of latches that present the encoded requesting CPU number to the referencing holding and selector circuits (circuits 30, 54 and 55 or FIG. 4A, collectively). These signals tell the holding and selector circuits which CPU information, address, write data, etc. to send to the bank address register 59a and the bank write data register 59b.

Bank and write busy circuit 92 uses the set bank/write signals from circuit 84 to actually set the bank busy latches and the write busy latches. This information is then returned to the selector circuit 72 for the next reference request evaluation on the next clock period.

Circuit 60 also generates a go-bank signal to the bank address registers 59a. This is determined by a release and a bank decode, then delayed to meet the correct information from the reference holding and selector circuit at the bank address registers 59a. A go-bank write signal is also generated by circuit 60 to the bank write data registers 59b. This is determined by a release and a bank write decode then delayed to meet the correct information from the reference holding and selector circuit at the bank write data register 59b.

Circuit 60 times each bank busy to be a designated number of clock periods (e.g. 5,6,7 or 8) in length, depending on the speed of the memory, with the number being programmable by two force signals sent from a clock control module (not shown).

Based upon bank busy timing, circuit 60 generates a signal which is delayed and presented to selector 39a at the correct time to sample read data. Also, circuit 60, based upon the bank busy timing, produces a signal which is delayed and presented to circuit 40 (FIG. 4B)

at the correct time to route the read data to the proper holding register (comprised of circuits 42, 43 and 44 of FIG. 4B) for the requesting CPU. Circuit 40 routes the read data to the proper sub-section register 43 (i.e. one of 0-7) based on which signal path 28 it is received on (i.e. based on its sub-section of origin).

As referred to above, circuit 60 also includes a priority counter which is used to set the priority between CPUs. The counter is 4 bits in length. After master clear it has a value of "o" and will increment only on command from the clock control module (not shown). The counters for all circuits 60 are synchronized so that each has the same-value at the same time. The counter can have values from 0 to 15, one for each CPU. The value of the count is the highest priority CPU.

$2°$ of the counter will control odd even pairs so that
0=0/1, 2/3, 4/5 etc.
1=1/0, 3/2, 5/4 etc.

$2^1$ of the counter will control groups of two CPUs so that
0=(01)/(23), (45)/(67) etc.
1=(23)/(01), (67)/(45) etc.

$2^2$ of the counter will control groups of four CPUs so that
0=(0-3)/(4-7), (8-11)/(12-15)
1=(4-7)/(0-3), (12-15)/(8-11)

$2^3$ of the counter will control groups of eight CPUs so that
0=(0-7)/(8-15)
1=(8-15)/(0-7)

The priority of each CPU on each count is set forth in the following table:

| | REQ/CPU PRIORITY ORDER | | | | | | | | | | | | | | | |
|---|---|---|---|---|---|---|---|---|---|---|---|---|---|---|---|---|
| | HI | | | | | | | | | | | | | | | LO |
| Count = 0 | 0 | 1 | 2 | 3 | 4 | 5 | 6 | 7 | 8 | 9 | 10 | 11 | 12 | 13 | 14 | 15 |
| 1 | 1 | 0 | 3 | 2 | 5 | 4 | 7 | 6 | 9 | 8 | 11 | 10 | 13 | 12 | 15 | 14 |
| 2 | 2 | 3 | 0 | 1 | 6 | 7 | 4 | 5 | 10 | 11 | 8 | 9 | 14 | 15 | 12 | 13 |
| 3 | 3 | 2 | 1 | 0 | 7 | 6 | 5 | 4 | 11 | 10 | 9 | 8 | 15 | 14 | 13 | 12 |
| 4 | 4 | 5 | 6 | 7 | 0 | 1 | 2 | 3 | 12 | 13 | 14 | 15 | 8 | 9 | 10 | 11 |
| 5 | 5 | 4 | 7 | 6 | 1 | 0 | 3 | 2 | 13 | 12 | 15 | 14 | 9 | 8 | 11 | 10 |
| 6 | 6 | 7 | 4 | 5 | 2 | 3 | 0 | 1 | 14 | 15 | 12 | 13 | 10 | 11 | 8 | 9 |
| 7 | 7 | 6 | 5 | 4 | 3 | 2 | 1 | 0 | 15 | 14 | 13 | 12 | 11 | 10 | 9 | 8 |
| 8 | 8 | 9 | 10 | 11 | 12 | 13 | 14 | 15 | 0 | 1 | 2 | 3 | 4 | 5 | 6 | 7 |
| 9 | 9 | 8 | 11 | 10 | 13 | 12 | 15 | 14 | 1 | 0 | 3 | 2 | 5 | 4 | 7 | 6 |
| 10 | 10 | 11 | 8 | 9 | 14 | 15 | 12 | 13 | 2 | 3 | 0 | 1 | 6 | 7 | 4 | 5 |
| 11 | 11 | 10 | 9 | 8 | 15 | 14 | 13 | 12 | 3 | 2 | 1 | 0 | 7 | 6 | 5 | 4 |
| 12 | 12 | 13 | 14 | 15 | 8 | 9 | 10 | 11 | 4 | 5 | 6 | 7 | 0 | 1 | 2 | 3 |
| 13 | 13 | 12 | 15 | 14 | 9 | 8 | 11 | 10 | 5 | 4 | 7 | 6 | 1 | 0 | 3 | 2 |
| 14 | 14 | 15 | 12 | 13 | 10 | 11 | 8 | 9 | 6 | 7 | 4 | 5 | 2 | 3 | 0 | 1 |
| 15 | 15 | 14 | 13 | 12 | 11 | 10 | 9 | 8 | 7 | 6 | 5 | 4 | 3 | 2 | 1 | 0 |

Thus, for example, on count 12 CPU 12 has highest priority and CPU 3 the lowest.

Thus, there has been described above a memory interface system for a multiple CPU system wherein the processors share a common memory with multiple ports. The system is designed to maximize memory referencing speed while minimizing the circuit design overhead, and to assure that all CPUs have reasonable access to the memory at all times so that no CPU is shut out for an extended period. Although the invention has been described in its preferred form, those of skill in the art will readily realize that various modifications and changes may be made to the disclosed embodiment without departing from the spirit and scope of the claims amended hereto.

We claim:

1. A system for sharing memory between a plurality of processors, each processor having a plurality of ports for generating memory references, said system comprising:
   a) a plurality of memory sections, each section connected to each processor by a memory path;
   b) each section including a plurality of memory subsections, each subsection including a plurality of memory groups, each group including a plurality of memory banks, each bank including a plurality of individual addressable memory locations; and
   c) means for connecting said memory banks to said memory path so that said processors can reference said shared memory through said ports, said means for connecting including, for each section:
   processor/section interface means for each CPU, said processor/section interface means for receiving memory references from an associated processor and for directing the memory references to the subsections in the section;
   group interface means for each group in each subsection, said group interface means comprising a plurality of latches, one for each processor, each to receive memory references for the group from said associated processor;
   fan-out means, for each subsection, for applying memory references from said processor/section interface means to said plurality of latches in each of said group interface means of the subsection so that latches for said associated processor in each group simultaneously receive the memory references from said associated processor;
   group level reference means, in each group, for forwarding memory references held in the latches to the banks to address individual memory locations; and
   means for carrying data in and out of each section to and from each processor.

2. The system according to claim 1 further comprising reference control circuit means for each group for controlling memory references to the group, each said reference control circuit means including:
   a) means for receiving from each processor a memory reference request comprising a go-section signal, a write signal, and address signals designating the memory to be referenced;
   b) bank busy means for tracking which banks in the group are busy; and
   c) means responsive to said bank busy means for arbitrating conflicts between requests issued by different processors, and for directing said group level reference means to apply selected memory references to the memory banks.

3. The system according to claim 2 further wherein said reference control circuit means includes a processor priority counter, and further wherein said means responsive to said bank busy means includes means responsive to said priority counter for arbitrating conflicts based on a priority for each processor determined by a priority counter, the priority counters for all the reference control circuit means being synchronized.

4. The system according to claim 3 further wherein said reference control circuit means includes means for holding conflicting memory references and resubmitting held memory references on a succeeding clock period of a system so that the resubmitted memory reference is re-evaluated by said reference control circuit means.

5. The system according to claim 2 further wherein said memory reference control circuit means is responsive to a reference request wherein said go-section signal directs said memory reference request.

6. The system according to claim 5 further wherein said reference control circuit means includes means for causing said latches in said group interface means to latch requests that are directed to the associated group, so that the request can be subsequently issued to the memory.

7. The system according to claim 1 further wherein said means for carrying data includes a plurality of data output means for each section of memory, each data output means handling the output of data for a unique group of processors in the system, each said data output means including, for each processor it handles data output for, means for holding a word of read data for each subsection in the section, and means for directing a read data word held in said means for holding to the memory path for the processor.

* * * * *